(12) United States Patent
Sherman et al.

(10) Patent No.: US 9,558,287 B2
(45) Date of Patent: Jan. 31, 2017

(54) AUTOMATIC REMOVAL OF INAPPROPRIATE CONTENT

(71) Applicants: Yahali Sherman, Tel Aviv (IL); Rachel Ebner, Ra'anana (IL); Eyal Nathan, Reut (IL); Dmitry Khalatov, Yokneam (IL); Ariel Tammam, Ramat Gan (IL)

(72) Inventors: Yahali Sherman, Tel Aviv (IL); Rachel Ebner, Ra'anana (IL); Eyal Nathan, Reut (IL); Dmitry Khalatov, Yokneam (IL); Ariel Tammam, Ramat Gan (IL)

(73) Assignee: SAP Portals Israel Ltd., Ra'anana (IL)

( * ) Notice: Subject to any disclaimer, the term of this patent is extended or adjusted under 35 U.S.C. 154(b) by 171 days.

(21) Appl. No.: 14/035,038

(22) Filed: Sep. 24, 2013

(65) Prior Publication Data

US 2015/0088897 A1 Mar. 26, 2015

(51) Int. Cl.
*G06F 17/30* (2006.01)
*G06Q 10/00* (2012.01)

(52) U.S. Cl.
CPC ........... *G06F 17/3089* (2013.01); *G06F 17/30* (2013.01); *G06F 17/30876* (2013.01); *G06Q 10/00* (2013.01)

(58) Field of Classification Search
CPC . G06F 17/30; G06F 17/3089; G06F 17/30876
USPC ........... 707/740, 754, 959, 999.001, 999.002
See application file for complete search history.

(56) References Cited

U.S. PATENT DOCUMENTS 5,752,242 A * 5/1998 Havens
7,305,436 B2 12/2007 Willis
8,046,010 B2 10/2011 Dubin et al.
8,171,388 B2 5/2012 Zaltzman et al.
8,311,950 B1 11/2012 Kunal et al.
8,601,596 B2 12/2013 Wu et al.
8,620,723 B1 12/2013 Good
8,849,911 B2 9/2014 Rubinstein et al.
(Continued)

OTHER PUBLICATIONS

Lops et al, "Content-based and collaborative techniques for tag recommendation: an empirical", Journal of Intelligent Information Systems, vol. 40 Issue 1, Aug. 17, 2012, pp. 41-61.*

(Continued)

*Primary Examiner* — Tony Mahmoudi
*Assistant Examiner* — Kamal Dewan
(74) *Attorney, Agent, or Firm* — Fish & Richardson P.C.

(57) ABSTRACT

The disclosure generally describes computer-implemented methods, software, and systems for automatically removing inappropriate content. One example method includes: identifying a report of inappropriate content received from a user, the report identifying a content item the user has identified as inappropriate and an identification of the user, determining whether to automatically remove the content item based at least in part on the identity of the user, and removing the content item upon determining that the content should be removed. In some instances, the user is associated with a report weight. The report weight can be based, at least in part, on a business role of the user. Determining whether to automatically remove the content item may include determining that the user or a business role of the user is associated with an automatic removal rule, and removing the content item upon determining that the report is associated the user.

15 Claims, 4 Drawing Sheets

(56) References Cited

U.S. PATENT DOCUMENTS

| | | | |
|---|---|---|---|
| 8,856,165 B1* | 10/2014 | Cierniak | G06Q 10/10 705/28 |
| 2008/0162266 A1 | 7/2008 | Griessmann et al. | |
| 2008/0162540 A1* | 7/2008 | Parikh | G06F 17/30867 |
| 2009/0012965 A1* | 1/2009 | Franken | 707/10 |
| 2009/0132689 A1* | 5/2009 | Zaltzman et al. | 709/223 |
| 2009/0182770 A1* | 7/2009 | Madhavan | G06F 17/30607 |
| 2011/0088046 A1 | 4/2011 | Guertler et al. | |
| 2011/0137909 A1 | 6/2011 | Guertler et al. | |
| 2011/0289011 A1* | 11/2011 | Hull et al. | 705/319 |
| 2013/0018823 A1* | 1/2013 | Masood | 706/12 |
| 2013/0018957 A1 | 1/2013 | Parnaby et al. | |
| 2013/0086483 A1 | 4/2013 | Vainer et al. | |
| 2013/0086495 A1 | 4/2013 | Guzansky et al. | |
| 2013/0091132 A1 | 4/2013 | Khalatov et al. | |
| 2013/0091456 A1 | 4/2013 | Sherman et al. | |
| 2013/0132420 A1 | 5/2013 | Vainer et al. | |
| 2013/0144957 A1 | 6/2013 | Sherman et al. | |
| 2013/0145006 A1 | 6/2013 | Tammam | |
| 2013/0151609 A1* | 6/2013 | Rubinstein et al. | 709/204 |
| 2013/0152211 A1 | 6/2013 | Wu et al. | |
| 2013/0159926 A1 | 6/2013 | Vainer et al. | |
| 2013/0226708 A1 | 8/2013 | Good et al. | |
| 2013/0282722 A1 | 10/2013 | Grenier et al. | |
| 2013/0303204 A1 | 11/2013 | Dudley | |
| 2014/0059203 A1 | 2/2014 | Trabelsi et al. | |

OTHER PUBLICATIONS

U.S. Appl. No. 13/438,098, filed Apr. 3, 2012, Nathan et al.
U.S. Appl. No. 13/534,737, filed Jun. 27, 2012, Tammam et al.
U.S. Appl. No. 13/541,557, filed Jul. 3, 2012, Vainer et al.
U.S. Appl. No. 13/546,825, filed Jul. 11, 2012, Yahali Sherman.
U.S. Appl. No. 13/595,268, filed Aug. 27, 2012, Lehmann et al.
U.S. Appl. No. 13/660,698, filed Oct. 25, 2012, Bleier et al.
U.S. Appl. No. 13/732,792, filed Jan. 2, 2013, Lehmann et al.
U.S. Appl. No. 13/740,858, filed Jan. 14, 2013, Nathan et al.
U.S. Appl. No. 13/760,300, filed Feb. 6, 2013, Ebner et al.
U.S. Appl. No. 13/795,892, filed Mar. 12, 2013, Ebner et al.
U.S. Appl. No. 13/904,544, filed May 29, 2013, Lehmann et al.
U.S. Appl. No. 13/916,857, filed Jun. 13, 2013, Lehmann et al.
U.S. Appl. No. 13/943,581, filed Jul. 16, 2013, Lehmann et al.
U.S. Appl. No. 13/970,977, filed Aug. 20, 2013, Nathan et al.

* cited by examiner

AUTOMATIC REMOVAL OF INAPPROPRIATE CONTENT

BACKGROUND

Inappropriate content, including, but not limited to, abusive content, unlawful statements and information, and other content that violates the terms of service of websites and message boards, consistently find their way onto the Internet. In most cases, sites provide hyperlinks and defined processes for notifying site administrators of the content and manually initiating the removal process.

SUMMARY

The disclosure generally describes computer-implemented methods, software, and systems for automatically removing inappropriate content. One example method includes: identifying a report of inappropriate content received from a user, the report identifying a content item the user has identified as inappropriate and an identification of the user, determining whether to automatically remove the content item based at least in part on the identity of the user, and removing the content item upon determining that the content should be removed. In some instances, the user is associated with a report weight. The report weight can be based, at least in part, on a business role of the user. Determining whether to automatically remove the content item may include determining that the user or a business role of the user is associated with an automatic removal rule, and removing the content item upon determining that the report is associated the user.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
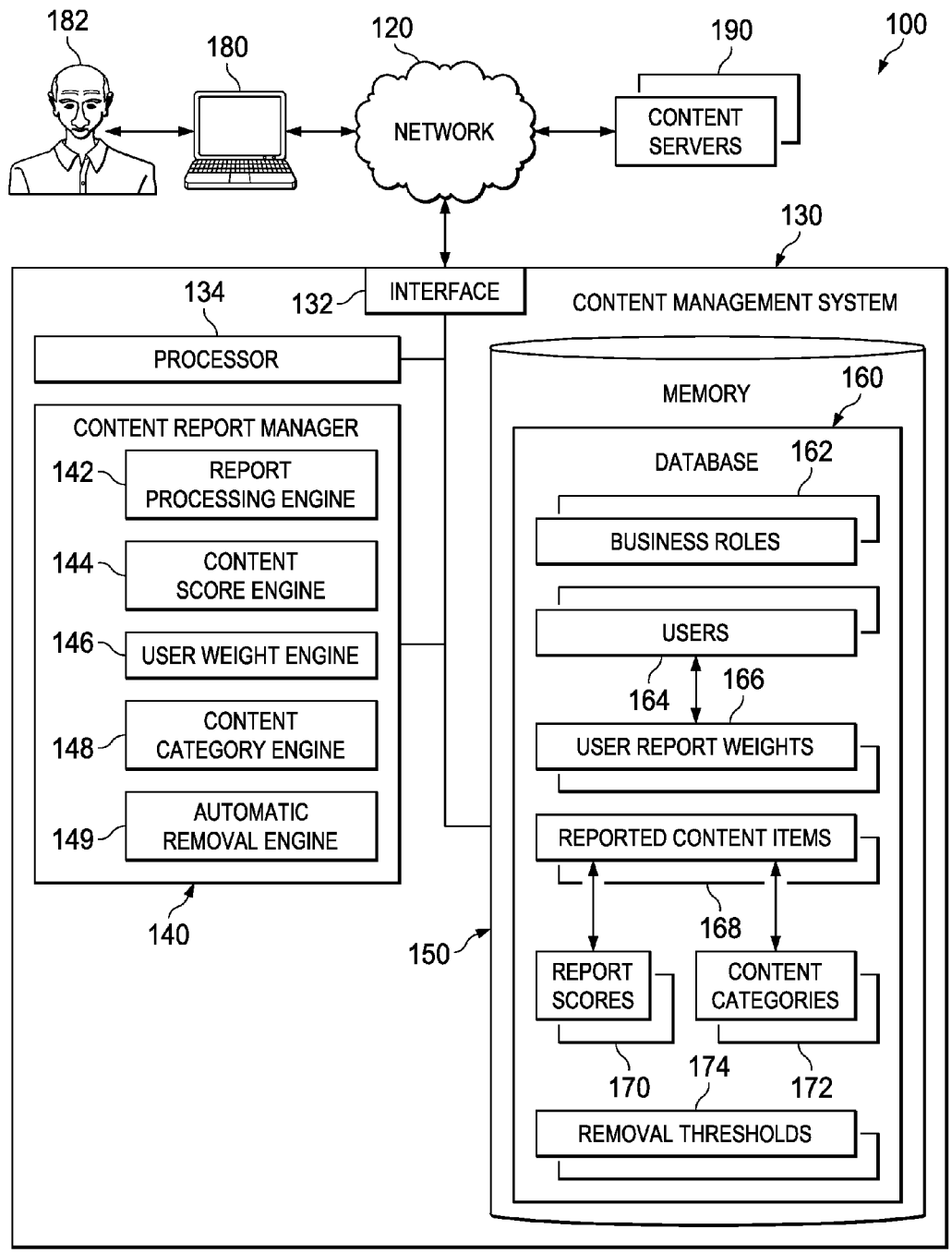
FIG. 1 illustrates an example of a computer system environment for automatically removing inappropriate content.

The present disclosure provides tools and systems for automatically removing inappropriate content from websites, message boards, frequently asked question (FAQ) lists, wiki pages, blog posts, user comments, and other suitable online locations. As usage of the Internet increases, inappropriate, and sometimes abusive content, has become more and more common in online communities. The present disclosure describes new mechanisms and processes for identifying and reporting inappropriate content by users, and, based on an evaluation of the inappropriateness of the content and the identity of the reporting user, can automatically remove the identifying and reported inappropriate content. Inappropriate content can include any number of abusive, insensitive, or illegal content, as well as content violating a particular location's terms of service or usage. The present disclosure allows for fast removal of such inappropriate content, and can remove the need for a time-consuming manual review process prior to removal. In this way, the tools of the present disclosure can ensure that the inappropriate content is timely removed, and not available for additional views while a manual review process is initiated and occurs.

The tools and systems perform the automatic removal by analyzing one or more reports of inappropriate content, as well as the particular users who submitted those reports, and automatically remove inappropriate content based on an analysis related to one or more trust rules. Various factors and weighting may be applied to the received reports. One or more evaluation metrics may be considered in determining whether or not to remove the content, including, but not limited to:

the identify of a reporting user;
the role of a reporting user;
the accuracy or inaccuracy of previous reports received from a reporting user;
the type or category of content identified in the report;
the number of times a particular content item has been reported as inappropriate; and
a cumulative consideration of the evaluations a plurality of reports associated with a particular content item.

Automatic removal algorithms may differ between implementations, and may weigh different evaluation aspects of a particular report and reporting user differently. In some algorithms, a role of a reporting user may be heavily weighted in a determination of whether to remove a particular content item. In some instances, the fact that a user associated with a particular role or set of roles (e.g., CEO, CFO, COO, site moderator, blog owner, etc.) has reported a content item as inappropriate may be, alone, enough to initiate an automatic removal process. Additionally, certain reporting users may be identified as final arbiters of inappropriateness—if such a user submits an inappropriateness report, the identified content item may be removed automatically. In some instances, certain roles may be associated with a weighing factor, such that reports received from those users are considered more heavily (or less heavily) than a generic report according to their weighting factor. For example, a vice president or brand manager of a company may be weighted much higher than a regular employee or outside user. In some instances, the weight may be so significant that a single request from the CEO may be sufficient to automatically initiate the automatic removal process. In other instances, the weighted score of the report may greatly affect the ultimate decision of whether to remove the identified content when considered with one or more additional reports of the same content.

In some instances, these weighting factors may be fluid. For example, a user may be provided an initial weighting of 1.0—that is, the user is not weighted more heavily or less heavily than a hypothetical generic user. If the user reports content as inappropriate, and upon evaluation, such content is removed as inappropriate, additional weight may be provided to that user's reports, and the weight may be increased by an appropriate amount. Similarly, if a user reports content as inappropriate and it is later determined not to be, the user's weighting may be decreased by an appropriate amount. This may be continued over time, with some user's weighting fluctuating accordingly. Additionally, users may receive an initial increased or decreased weighting based on their role with a business or entity as described above. Those weightings can be similarly adjusted based on the history of the user's reports as described above.

In some instances, the determination to remove reported content may be based on a plurality of reports, where each reported content item is associated with a report score. The report score can be based on a number of time a particular content item has been reported as inappropriate, where each reporting incident may be associated with a particular report weight based on one or more of the user reporting the content, the role of the user reporting the content, the category of the content, and other suitable factors. Adding those individual report scores may result in a cumulative report score, which can then be compared to a corresponding removal threshold. In some instances, the removal threshold may vary based on the corresponding content category. For example, if the reported content is based on foul or derogatory language, a first removal threshold may be used. Alternative category types, including sensitive company information, defamatory language, abusive language, and others may be associated with different removal thresholds. If the report score meets or exceeds the removal threshold, then the content item may be automatically removed. In some instances, should the report score not meet the removal threshold, a system admin or other person associated with the online location associated with the report can manually review the content to determine if removal is proper.

FIG. 1 illustrates an example of a computer system environment 100 for automatically removing inappropriate content. Specifically, the illustrated environment 100 includes or is communicably coupled with a content management system 130, one or more content servers 190, a client 180, and network 120.

In general, the content management system 130 is a server or set of servers that provide content management services in association with one or more applications, websites, and other online locations, including the one or more content servers 190. The content management system 130 can respond to one or more inappropriate content reports received from various users, including user 182 associated with client 180. In particular, the content management system 130 can perform operations associated with an automatic content removal process in response to requests received from users in environment 100, and can further respond accordingly. In some implementations, the content management system 130 may store and execute one or more additional processes (not shown), in addition to the operations related to the automatic content removal process (via the content report manager 140), as well as other types of processes and/or applications. In other implementations, the content management system 130 may be a dedicated system or server meant to store and execute only operations associated with the automatic content removal processes. In some implementations, the content management system 130 may comprise a Web server, where the content report manager 140 represents one or more Web-based services and/or applications accessed and executed by clients 180 and their applications via the network 120 or directly at the content management system 130 to perform the programmed tasks or operations of the content report manager 140.

At a high level, the content management system 130 comprises an electronic computing device operable to receive, transmit, process, store, or manage data and information associated with the environment 100. Specifically, the content management system 130 illustrated in FIG. 1 is responsible for receiving user reports, identifying potentially inappropriate content, and subsequently determining whether or not the potentially inappropriate content should be removed. In addition to requests from the external clients 180, requests associated with the automatic content removal process may also be sent from internal, or local, users, external or third-party customers, automated applications or processes, employees, as well as any other appropriate entities, individuals, systems, or computers. Users submitting reports may use a button, hyperlink, or other suitable component within a UI associated with the online location of the potentially inappropriate content to submit said reports. Further, users may be able to annotate portions of the online location (e.g., a particular post, comment, section, page, etc.) which they believe to be inappropriate, such that the report is specific to the particular portion of the online location.

As used in the present disclosure, the term "computer" is intended to encompass any suitable processing device. For example, although FIG. 1 illustrates a single content management system 130, environment 100 can be implemented using two or more such systems, a plurality of servers as well as computers other than servers, including a server pool. Indeed, content management system 130 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, illustrated content management system 130 may be adapted to execute any operating system, including Linux, UNIX, Windows, Mac OS®, Java™, Android™, iOS or any other suitable operating system. According to one implementation, the content management system 130 may also include or be communicably coupled with an e-mail server, a Web server, a caching server, and/or other suitable server or computer.

In the present illustration, the content management system 130 hosts and/or supports the content report manager 140 and its associated engines and processes, which include a report processing engine 142, a content score engine 144, a user weight engine 146, a content category engine 148, and an automatic removal engine 149. As described, the content report manager 140 receives one or more reports from users via clients 180 regarding content items included in content servers 190 which those reporting users believe to be inappropriate. Reports can be generated or prepared after activating a hyperlink, button, or other UI element associated with the identified content item, and the report can be sent to the content report manager 140 for analysis and evaluation. In some instances, the hyperlink or button may generate reports or messages regarding the identified content item and the user initiating the report, where those reports or messages are provided to the content report manager 140 via one or more suitable application programming interfaces (APIs) (not shown). The report processing engine 142 may be the initial recipient of the report, and can parse the report to determine the identified content and the reporting user.

Using this information, the user weight engine 146 can determine a current weight associated with the reporting user. As discussed above, users of different positions in or associated with a business or entity may have different weights, in effect making their reports more or less valued by the system in determining whether the associated content should be automatically removed. The user's associated weight can fluctuate over time based on changes in positions or roles. Additionally, the user's associated weight can change based on the relative correctness of prior reports requesting removal of potentially inappropriate content. As illustrated, database 160 can store information associated with each user (164), which can be used to derive a particular report weight 166 associated with that user. In some instances, a user's business role 162 may be used to further determine a report weight 166 to be associated with the particular user's reports. As described above, the user's business role 162, as well as alternative types of defined roles (e.g., unpaid site moderator, valued contributor, etc.) can determine an initial weighting of the user's report, defined as the report weight 166 for a particular user. Those initial weights may remain as a constant in some instances, while in others, the weights may fluctuate as additional feedback on one or more other reports are received. Where a user submits a report on an item that is ultimately removed, that user may be considered more trustworthy, and therefore provided with a higher report weight 166. Similarly, should a user submit a report on an item that is not ultimately removed, that user may be considered less trustworthy, and therefore provided with a lower report weight 166. These values may fluctuate as content is identified and evaluated. The user weight engine 146 can perform the operations that modify a particular user's report weight 166.

The content category engine 148 determines the type or category of content associated with the received report. In some instances, the report may include an identification of the category of content, either provided manually by the reporting user or generated automatically based on an automated review of the identified content or based on a predefined content type associated with the portion of the website or other online location associated with the report. Different types and categories of content may be associated with different levels of removal thresholds 174, where the removal thresholds represent thresholds of report scores needed to automatically remove potentially inappropriate content. For example, different types of content may include abusive language (i.e., foul language, bigoted language, etc.), sensitive company information, or other suitable types. Sensitive company information, such as financial information, may be associated with a relatively low removal threshold, such that almost any user (i.e., depending on their respective report weights 166) identifying such information may result in the information being removed. Abusive language, depending on the type of online location, may be associated with a higher removal threshold 174, which may require two or more users (again, based on their respective report weights 166) to report such content before invoking the removal process.

The content score engine 144 can perform the evaluations related to calculating a report score for reporting instance, as well as for each identified content in the case of multiple reports. Further, the content score engine 144 can compare the report score of the individual report or plurality of reports related to a common content item to the corresponding removal threshold 174 of the content item and/or its associated category or type. In some instances, in order to determine an individual report score, the content score engine 144 can determine a particular report weight 166 associated with the reporting user, and use that report weight 166 to calculate the individual report score. In instances where multiple reports are received for a single content item, the content score engine 144 can determine the individual report scores and combine them to identify a cumulative report score. Should the cumulative report score exceed the corresponding removal threshold 174, the associated content item 168 can be automatically removed. This algorithm represents an example algorithm. Any other suitable algorithms can also be used to determine when to trigger the automatic removal process.

The automatic removal engine 149 can perform the operations necessary to remove or trigger the removal of a particular content item. In some instances, the automatic removal engine 149 can access the source code or databases associated with the corresponding content server 190 to remove the identified content item, while in other instances, the automatic removal engine 149 can request or remotely trigger removal of the content in those servers or systems via a remote function call, request, or other instruction. In some instances, the automatic removal engine 149 can notify some or all of the reporting users of the removal of the identified content items. Additionally, the automatic removal engine 149 may notify the user weight engine 146 when a content item is removed, allowing the user weight engine 146 to update the report weights 166 associated with particular reporting users. Additionally, the automatic removal engine 149 may notify the user weight engine 146 when a content item is not removed, allowing the user weight engine 146 to negatively adjust the associated reporting users' report weights 166.

As illustrated, the content management system 130 includes an interface 132, a processor 134, and a memory 150. The interface 132 is used by the content management system 130 for communicating with other systems in a distributed environment—including within the environment 100—connected to the network 120, for example, one of the clients 180 or content servers 190, as well as other systems communicably coupled to the network 120 (including those not illustrated). Generally, the interface 132 comprises logic encoded in software and/or hardware in a suitable combination and operable to communicate with the network 120. More specifically, the interface 132 may comprise software supporting one or more communication protocols associated with communications, such that the network 120 or the interface's hardware is operable to communicate physical signals within and outside of the illustrated environment 100.

As illustrated in FIG. 1, the content management system 130 includes a processor 134. Although illustrated as a single processor 134 in FIG. 1, two or more processors may be used according to particular needs, desires, or particular implementations of the environment 100. Each processor 134 may be a central processing unit (CPU), a blade, an application specific integrated circuit (ASIC), a field-programmable gate array (FPGA), or another suitable component. Generally, the processor 134 executes instructions and manipulates data to perform the operations of the content management system 130. Specifically, the processor 134 executes the functionality required to receive and respond to requests from the various devices, including the execution of the content report manager 140.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4 GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The content management system 130 includes a memory (or multiple memories) 150. The memory 150 may include any type of memory or database module and may take the form of volatile and/or non-volatile memory including, without limitation, magnetic media, optical media, random access memory (RAM), read-only memory (ROM), removable media, or any other suitable local or remote memory component. The memory 150 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the content management system 130, such as database 160. Additionally, the memory 150 may include any other appropriate data, such as VPN applications, firmware logs and policies, firewall policies, a security or access log, print or other reporting files, as well as others.

As described, database 160 includes information on one or more users 164, one or more roles 162 (including business roles) associated with at least some of the users 164, and report weights 166 associated with the users 164. Database 160 may further include information defining one or more reported content items 168 and any calculated report scores 170 associated with those reported content items 168. In some instances, one or more of the reported content items 168 may be associated with a particular content category or type 172. Additionally, various levels of removal thresholds 174 may be stored in database 160.

Network 120 facilitates wireless or wireline communications between the components of the environment 100 (i.e., between the content management system 130 and the one or more clients/devices or content servers 190), as well as with any other local or remote computer, such as additional clients, servers, or other devices communicably coupled to network 120, including those not illustrated in FIG. 1. In the illustrated environment, the network 120 is depicted as a single network, but may be comprised of more than one network without departing from the scope of this disclosure, so long as at least a portion of the network 120 may facilitate communications between senders and recipients. In some instances, one or more of the components associated with the content management system 130 may be included within network 120 as one or more cloud-based services or operations. For example, at least a portion of the content management system 130 may be within the network 120, and operated at least partially within or as a cloud-based system, including, in some instances, multiple remote processors performing the operations described herein.

The network 120 may be all or a portion of an enterprise or secured network, while in another instance, at least a portion of the network 120 may represent a connection to the Internet. In some instances, a portion of the network 120 may be a virtual private network (VPN). Further, all or a portion of the network 120 can comprise either a wireline or wireless link. Example wireless links may include 802.11a/b/g/n, 802.20, WiMax, LTE, and/or any other appropriate wireless link. In other words, the network 120 encompasses any internal or external network, networks, sub-network, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), all or a portion of the Internet, and/or any other communication system or systems at one or more locations.

The illustrated environment of FIG. 1 also includes the client 180 and one or more content servers 190. Each of these devices may be any computing device operable to connect to or communicate with at least the content management system 130 via the network 120 using a wireline or wireless connection. In general, the content servers 190 and the client 180 comprise electronic computer devices operable to receive, transmit, process, and store any appropriate data associated with the environment 100 of FIG. 1. These devices/systems can connect to the content management system 130 either directly or with the help of a client-based wrapper. Connections between the clients/servers and the content management system 130 can be established, for instance, using HTTP or RFC protocols depending on client technologies and implementation preferences.

The content servers 190 may be associated with one or more online locations in which the automatic removal of potentially inappropriate content is performed. In some instances, the content servers 190 may be Web servers supporting one or more types of online locations, including web pages, wikis, blogs, company websites, review websites, message boards, and others. These content servers 190 may include a plurality of content items, and may provide or make available elements capable of initiating a report of potentially inappropriate content. In some instances, at least a portion of the content servers 190 may be included in the same system of the content management system 130, such that the reported content items 168 are available on the content management system 130.

Each client 180 may be any device suitable to view and execute web pages and operations associated with the content servers 190. Further, the client 180 may include a graphical user interface (GUI) (not shown). The GUI interfaces with at least a portion of the environment 100 for any suitable purpose, including generating a visual representation of content items associated with one or more of the content servers 190. In some instances, the GUI may be associated with a Web browser or other client application. The GUI may be used to view and navigate various Web pages located both internally and externally to the content servers 190. The GUI may comprise a graphical user interface operable to, for example, allow the user of the client 180 to interface with at least a portion of the content server 190, and in some cases, the content management system 130, as well as other applications. Generally, the GUI provides the particular associated user 182 with an efficient and user-friendly presentation of data provided by or communicated within the system. The GUI may comprise a plurality of customizable frames or views having interactive fields, pull-down lists, and buttons operated by the user. Generally, the GUI may also provide general interactive elements that allow a user to access and utilize various services and functions of one or more applications, such as links or buttons associated with submitting particular content items as potentially inappropriate. The GUI may present information associated with the respective applications for viewing and interaction. In general, the GUI is often configurable, supports a combination of tables and graphs (bar, line, pie, status dials, etc.), and is able to build real-time portals, where tabs are delineated by key characteristics (e.g., site or micro-site). Therefore, the GUI contemplates any suitable graphical user interface, such as a combination of a generic web browser, intelligence engine, and command line interface (CLI) that processes information in the platform and efficiently presents the results to the user 182 visually.

There may be any number of client or mobile devices associated with, or external to, the environment 100. For example, while the illustrated environment 100 includes one client, alternative implementations of the environment 100 may include multiple client devices communicably coupled to the network, or any other number suitable to the purposes of the environment 100. Additionally, there may also be one or more additional clients external to the illustrated portion of the environment 100 that are capable of interacting with the environment 100 via the network 120. Further, the term "user" and "administrator" may be used interchangeably as appropriate without departing from the scope of this disclosure. Moreover, while the client 180 is described in terms of being used by a single user 184, this disclosure contemplates that many users may use one computer or that one user may use multiple computers. Based on the respective user's identity, role, and history, the content report manager 140 can determine how to evaluate received reports about specific content items received from or associated with a particular user 182.

While FIG. 1 is described as containing or being associated with a plurality of elements, not all elements illustrated within environment 100 of FIG. 1 may be utilized in each alternative implementation of the present disclosure. For example, although FIG. 1 depicts a particular environment 100, any suitable alternative environments and implementations are considered. Additionally, one or more of the elements described herein may be located external to environment 100, while in other instances, certain elements may be included within, or as a portion of, one or more of the other described elements, as well as other elements not described in the illustrated implementation. Further, certain elements illustrated in FIG. 1 may be combined with other components, as well as used for alternative or additional purposes in addition to those purposes described herein.

Figure 2:
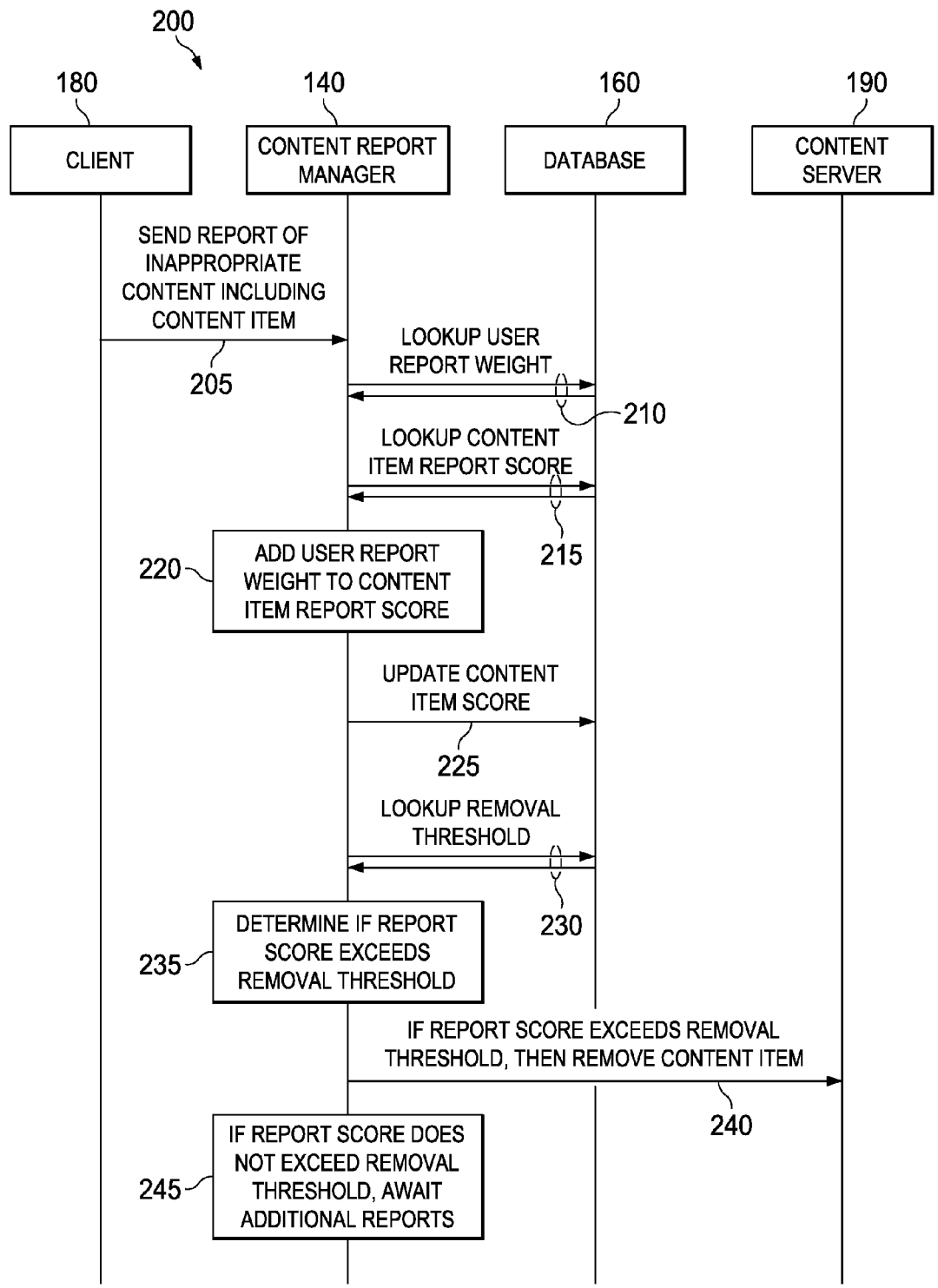
FIG. 2 illustrates a flow diagram describing an example method for reporting and removing inappropriate content.

FIG. 2 illustrates a flow diagram 200 describing an example method for reporting and removing inappropriate content. In the current description, the client 180 (associated with a particular user 182), content report manager 140, database 160 (including its various illustrated portions in FIG. 1), and content server 190 perform the operations of FIG. 2. In alternative implementations, one or more alternative, different, and/or additional components may perform similar operations.

At 205, client 180 sends a report of inappropriate content to the content report manager 140. The report is initiated by a user 182 associated with the client 180, and can be submitted via one or more suitable UI elements within a particular web page, portal, message board, or other appropriate context. In some instances, the tool may provide significant advantages in a portal environment. A portal can provide a site or location where information from a plurality of diverse sources is put together in a uniform way. Each information source (e.g., associated with one or more particular content servers 190) may be provided its own dedicated area for displaying information. In many situations, the role of the user in an organization may determine which content can be added to, deleted from, or modified within the portal. In some aspects, business information and data for an organization can be presented and/or available to users of various roles within the portal. The present solution can allow users to submit issues or inappropriate content via the portal (or other type of page or context), with an associated report (i.e., the report initiated by the user 182) being submitted. The report can identify and/or include the particular content item identified by the user, which may include a portion of the online location (i.e., a table, post, message, etc.) in which the potentially inappropriate material is located, as well as the entire webpage in which the potentially inappropriate material exists. The report can further include an identity of the user 182 associated with the report. By doing so, information associated with the user 182 can be determined and applied to the evaluation of the potentially inappropriate content.

At 210, the content report manager 140 performs a lookup operation at database 160 to identify the appropriate user report weight 166 associated with the user 182 submitting or associated with the report. At 215, the content report manager 140 performs a lookup operation at database 160 to identify a current content item report score for the content item. In some instances, the current content item report score may comprise an aggregated score of each individual report for a particular content item. Records for each individual report may be maintained as well.

At 220, the content report manager 140 adds the user report weight 166 associated with user 182 to the aggregated content item report score, and subsequently sends the updated content item report score to the database 160 for saving at 225. At 230, the content report manager 140 can perform a lookup operation at database 160 to determine the removal threshold (e.g., removal threshold 174). The removal threshold may be based on a default removal threshold value, or may be determined based on a category or type of identified content item.

Upon identifying the removal threshold, the content report manager 140 determines whether the aggregated content report score exceeds the removal threshold. If so, then the content report manager 140 sends a request 240 to remove the content item to the content server 190, where the content item can be removed. In some instances, the content report manager 140 may have sufficient authorization and editing capabilities to effect the removal of the content item itself, while in other instances, a component or process at the content server 190 may perform the removal in response to the request 240. Should the content report manager 140 determine that the content report score does not exceed the removal threshold, no immediate action may be taken. In some instances, potentially inappropriate content identified in one or more reports may be sent to a manual review queue after a pre-determined period of time. This can ensure that such reports can be given consideration, even where the number of reports is small.

Figure 3:
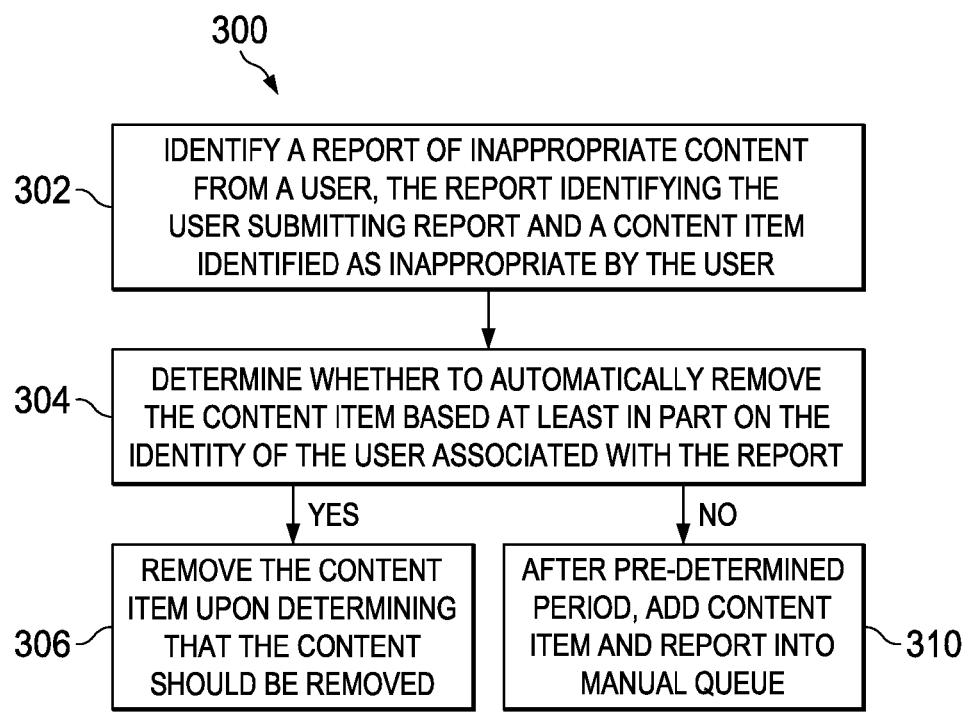
FIG. 3 illustrates an example method for automatically removing inappropriate content in response to a report received from a user in one example implementation of the present disclosure.

FIG. 3 illustrates an example method 300 for automatically removing inappropriate content in response to a report received from a user in one example implementation of the present disclosure. For clarity of presentation, the description that follows generally describes method 300 in the context of FIG. 1. However, it will be understood that method 300 may be performed, for example, by any other suitable system, environment, software, and hardware, or a combination of systems, environments, software, and hardware, as appropriate.

At 302, a report of inappropriate content submitted by a user is identified. The report can identify a content item the user identified as inappropriate. Additionally, the report can include the identity of the user submitting the report. In some instances, an identifier associated with the user may be included instead of the user's specific name, where the identifier allows identification of the user at a backend system.

At 304, a determination of whether to automatically remove the identified content item is performed based at least in part on the identity of the user associated with the report. In some instances, some users may be weighted such that any of their reporting of inappropriate content immediately results in automatic removal of the identified content item. In other instances, multiple factors, including prior reports related to the same subject matter, may also be considered. The identified report may be weighted based on a user's identity, role within the organization, and a trust value associated with the user based on prior reports. Using the user-specific weighting, a weighted report score associated with the identified report can be generated and used, at least in part, to determine whether to remove the content item.

If the determination results in automatic removal, the content item can be removed at 306. If the determination does not result in automatic removal, at 310 the report may be moved into a queue for manual review to ensure that the complaint is considered.

Figure 4:
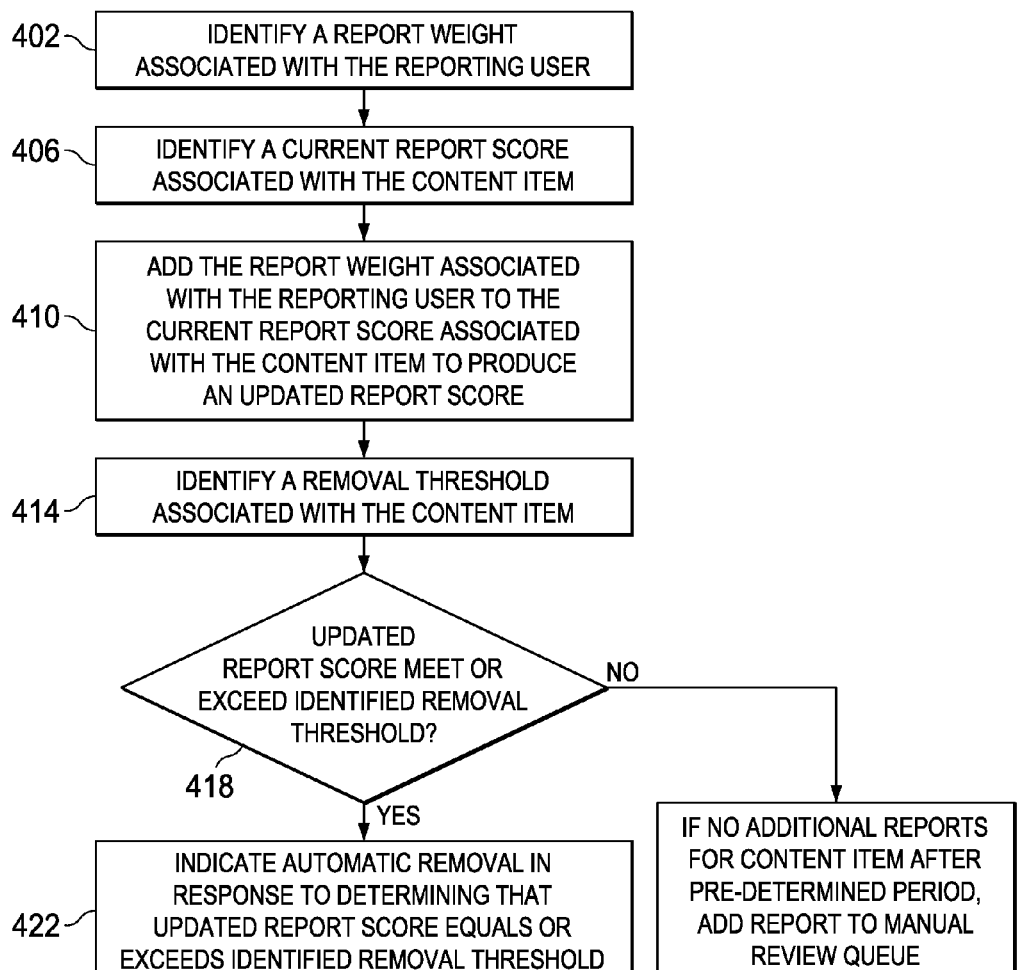
FIG. 4 illustrates an example method for evaluating whether to remove a content item in response to a report received from a user in one example implementation of the present disclosure.

FIG. 4 illustrates an example method 400 for evaluating whether to remove a content item in response to a report received from a user in one example implementation of the present disclosure. In some instances, method 400 may correspond to operation 304 of method 300.

At 402, a report weight associated with a received report is identified, where the report weight is based on the reporting user. The report weight may be defined in a table or database storing such information, where the particular report weight is associated with the user. In some instances, the report weight may be generally associated with a class of users, such as users in a particular role. As previously described, the report weight for a particular user can be based on one or more of the following: the user, the user's role in or association with the organization, and the user's reporting history, as well as others. The user's role may be defined as a particular position within an organization (e.g., CEO, CFO, systems administrator, blog author, etc.), an assigned position (e.g., webmaster, message board moderator, etc.), a role associated with a particular department within the organization, as well as others.

In some instances, a base weight may be initially provided to all reporting users. That weighting can be modified when the user is defined as having a particular role, such that any reports received from or associated with that user are weighted accordingly. Additionally, weighting may strengthen or weaken a particular user's report weight. For example, a salesperson associated with the organization may have a report weight lower than the base weight, while an online marketing employee may have a report weight higher than the base weight. Additionally, a feedback mechanism may strengthen or weaken a particular user's weighting over time. Using the online marketing employee as an example, such an employee may be provided with an initial report weight of 1.5. However, for each incorrect reporting of inappropriate content, that user's report weight may be decreased by 0.2. For each correct reporting, the user's report weight may be increased by 0.1. The changes may increase or decrease in a geometric or exponential series, or any other modification. In some instances, users associated with a certain role or position may have an upper or lower limit on their report weighting so that changes based on the history of the user's reporting can only affect the report weight a pre-defined amount. In some instances, the particular user associated with the report may be associated with a heavy weight (or an immediate determination of removal), such that any report from that particular user may immediately trigger an automatic removal. In any event, the report score of the identified report can be equal to the identified report weight.

At 406, a current report score associated with the content item is identified. The current report score can represent the aggregation of report scores from prior reports associated with the content item. The current report score can be stored in a suitable database or other location, and can be readily accessible when a new report for a particular content item is received.

At 410, the report score (based on the identified report weight) from the current report is added to the current report score associated with the content to produce an updated report score. The updated report score represents the aggregation of the prior reports and the newly received report associated with the identified report weight.

At 414, a removal threshold associated with the content item is identified. In some instances, a default removal threshold may be identified. For example, a default removal threshold may be 10. In other instances, additional information associated with or based on the content item or the reporting user may modify the removal threshold. The additional information associated with the content item may include the category of the reason for the inappropriate content report. For example, the inappropriate content report may be based on foul or derogatory language, abusive statements, sensitive or confidential information, and others. In some instances, the category of the content item may be adding by an annotation in the report, while in others a text- or context-based analysis may identify the appropriate category. In some instances, the online location associated with the content item may be used to determine or derive the appropriate removal threshold. For example, a website or message board associated with a child-related material may have a lower removal threshold, while a movie review site for adults may have a higher removal threshold. Business sites may be associated with still another removal threshold.

At 418, a determination is made as to whether the updated report score associated with the content item exceeds the identified removal threshold. If it does, method 400 continues at 422, where a process to automatically remove the identified content is initiated. The process may include notifying a content server associated with the content item of the requested removal, or may include directly removing the content item from the content server. If not, method 400 continues at 426. At 426, if no additional user reports associated with the content item are received after a predetermined period of time, then the report may be added to a manual review queue.

In some instances, an automatic removal may be reversible. For example, while a particular content item may be automatically removed based on one of the processes described herein, an administrator or other reviewer may receive a notice of same, or the removed content item may be placed into a removed items queue. The administrator may review removed content and provide a second-level determination as to whether the content item is truly inappropriate. If the administrator disagrees with the automatic removal, he or she can reverse the removal. Additionally, administrators may be able to view received reports. If one or more of the reports are determined to be erroneous, then the administrator can manually reduce the aggregated report score, or can increase the removal threshold for the content item.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method executed by one or more processors, the method comprising:
   identifying a report of inappropriate content received from a user, the report identifying a content item the user has identified as inappropriate and an identification of the user, wherein each user is associated with a report weight associated specifically with the particular user, the report weight based at least in part on a business role of the particular user, and wherein the identified content item is associated with a content item report score;
   determining whether to automatically remove the content item based at least in part on the identity of the user, wherein determining whether to automatically remove the content item comprises:
      determining whether the business role of the user is associated with an automatic removal rule, wherein the business role of the user is associated with an automatic removal rule when the report weight associated with the business role of the user meets or exceeds a predetermined removal threshold;
      in response to determining that the report weight associated with the business role of the user meets or exceeds the predetermined removal threshold, removing the content item without considering the content item report score; and
      in response to determining that the report weight associated with the business role of the user does not meet or exceed the predetermined removal threshold:
         combining the report weight associated with the user and the content item report score to generate an aggregated content item report score; and
         determining whether the aggregated content item report score meets or exceeds the predetermined removal threshold; and
      removing the content item upon determining that the content should be removed, wherein the determination that the content item should be removed is based on the aggregated content item score meeting or exceeding the predetermined removal threshold.

2. The method of claim 1, wherein the user is associated with a user-specific report weight.

3. The method of claim 1, wherein each of a plurality of business roles is assigned a corresponding report weight.

4. The method of claim 1, wherein the content item is associated with a pre-existing report score based on at least one prior report, and wherein determining whether to automatically remove the content item further comprises:
   adding the identified report weight associated with the user to the pre-existing report score associated with the content item based on the at least one prior report to produce an updated report score for the content item;
   comparing the updated report score of the content item with the removal threshold associated with the content item; and
   determining to automatically remove the content item if the updated report score exceeds or meets to the removal threshold.

5. The method of claim 4, further comprising increasing the report weight associated with the user upon determining to automatically remove the content item when a report of inappropriate content associated with the content item was previously received from the user.

6. The method of claim 4, further comprising:
   determining not to remove the content item if the updated report score is less than the removal threshold;
   continuing to identify reports of inappropriate content for the content item for a time period;
   determining that the report score associated with the content item remains below the removal threshold at the end of the time period; and
   decreasing the report weight of the user upon determining that the report score associated with the content item remains below the removal threshold at the end of the time period.

7. The method of claim 1, further comprising sending a request to a content server associated with the identified content item to remove the content item in response to determining to automatically remove the content item.

8. The method of claim 1, wherein the report of inappropriate content includes a content category indicating a type of inappropriate content associated with the content item.

9. The method of claim 8, wherein the content category includes at least one of: racism, abusive language, profane language, sexual content, or confidential information.

10. The method of claim 8, wherein the removal threshold is associated with the content category, and wherein each content category is associated with a specific removal threshold.

11. A system, comprising:
   a processor;
   a computer-readable storage medium coupled to the processor having instructions stored thereon which, when executed by the processor, cause the processor to perform operations comprising:

identifying a report of inappropriate content received from a user, the report identifying a content item the user has identified as inappropriate and an identification of the user, wherein each user is associated with a report weight associated specifically with the particular user, the report weight based at least in part on a business role of the particular user, and wherein the identified content item is associated with a content item report score; and determining whether to automatically remove the content item based at least in part on the identity of the user, wherein determining whether to automatically remove the content item comprises:

determining whether the business role of the user is associated with an automatic removal rule, wherein the business role of the user is associated with an automatic removal rule when the report weight associated with the business role of the user meets or exceeds a predetermined removal threshold;

in response to determining that the report weight associated with the business role of the user meets or exceeds the predetermined removal threshold, removing the content item without considering the content item report score; and in response to determining that the report weight associated with the business role of the user does not meet or exceed the predetermined removal threshold:

combining the report weight associated with the user and the content item report score to generate an aggregated content item report score; and determining whether the aggregated content item report score meets or exceeds the predetermined removal threshold; and removing the content item upon determining that the content should be removed wherein the determination that the content item should be removed is based on the aggregated content item score meeting or exceeding the predetermined removal threshold.

12. The system of claim 11, wherein the user is associated with a user-specific report weight.

13. The system of claim 11, wherein the content item is associated with a pre-existing report score based on at least one prior report, and wherein determining whether to automatically remove the content item further comprises:

adding the identified report weight associated with the user to the pre-existing report score associated with the content item based on the at least one prior report to produce an updated report score for the content item;

comparing the updated report score of the content item with the removal threshold associated with the content item; and determining to automatically remove the content item if the updated report score exceeds or meets to the removal threshold.

14. The system of claim 13, the operations further comprising increasing the report weight associated with the user upon determining to automatically remove the content item when a report of inappropriate content associated with the content item was previously received from the user.

15. A computer program product embodied in a non-transitory computer-readable storage medium and comprising instructions that when executed by a processor, the method comprising:

identifying a report of inappropriate content received from a user, the report identifying a content item the user has identified as inappropriate and an identification of the user, wherein each user is associated with a report weight associated specifically with the particular user, the report weight based at least in part on a business role of the particular user, and wherein the identified content item is associated with a content item report score; and determining whether to automatically remove the content item based at least in part on the identity of the user, wherein determining whether to automatically remove the content item comprises:

determining whether the business role of the user is associated with an automatic removal rule, wherein the business role of the user is associated with an automatic removal rule when the report weight associated with the business role of the user meets or exceeds a predetermined removal threshold;

in response to determining that the report weight associated with the business role of the user meets or exceeds the predetermined removal threshold, removing the content item without considering the content item report score; and in response to determining that the report weight associated with the business role of the user does not meet or exceed the predetermined removal threshold:

combining the report weight associated with the user and the content item report score to generate an aggregated content item report score; and determining whether the aggregated content item report score meets or exceeds the predetermined removal threshold; and removing the content item upon determining that the content should be removed wherein the determination that the content item should be removed is based on the aggregated content item score exceeding the predetermined removal threshold.

* * * * *